(12) United States Patent
Jaaskelainen

(10) Patent No.: US 10,669,835 B2
(45) Date of Patent: Jun. 2, 2020

(54) CLAMPLESS CABLE PROTECTOR AND INSTALLATION SYSTEM

(71) Applicant: Halliburton Energy Services, Inc., Houston, TX (US)

(72) Inventor: Mikko Jaaskelainen, Katy, TX (US)

(73) Assignee: Halliburton Energy Services, Inc., Houston, TX (US)

(*) Notice: Subject to any disclaimer, the term of this patent is extended or adjusted under 35 U.S.C. 154(b) by 231 days.

(21) Appl. No.: 15/763,900

(22) PCT Filed: Nov. 18, 2015

(86) PCT No.: PCT/US2015/061295
§ 371 (c)(1),
(2) Date: Mar. 28, 2018

(87) PCT Pub. No.: WO2017/086947
PCT Pub. Date: May 26, 2017

(65) Prior Publication Data
US 2019/0055833 A1 Feb. 21, 2019

(51) Int. Cl.
*B23K 1/00* (2006.01)
*E21B 47/01* (2012.01)
(Continued)

(52) U.S. Cl.
CPC .......... *E21B 47/011* (2013.01); *B23K 9/0953* (2013.01); *B23K 9/16* (2013.01);
(Continued)

(58) Field of Classification Search
CPC .... E21B 47/011; E21B 17/1035; E21B 47/01; E21B 17/003; B23K 9/16; B23K 9/0953
See application file for complete search history.

(56) References Cited

U.S. PATENT DOCUMENTS 3,541,296 A * 11/1970 Rudd ............... B23K 11/08
219/117.1
3,975,617 A * 8/1976 Othmer ............ H05B 6/108
392/469

(Continued)

FOREIGN PATENT DOCUMENTS

DE 4003311 A * 8/1991
JP 56023315 A * 3/1981
(Continued)

OTHER PUBLICATIONS

International Patent Application No. PCT/US2015/061295, "International Search Report and Written Opinion", dated Aug. 18, 2016, 12 pages.
(Continued)

*Primary Examiner* — Kiley S Stoner
(74) *Attorney, Agent, or Firm* — Kilpatrick Townsend & Stockton LLP

(57) ABSTRACT

A cable protector can include a first side bar welded along a length of a casing section. A second side bar can be welded along the length of the casing section. The second side bar can be positioned substantially parallel to the first side bar. A cable can be positioned between the first side bar and the second side bar. The cable can be positioned while the casing section is being run-in-hole. A cover strip can be welded on top of first side bar and the second side bar. The cover strip can be welded in place while the casing section is being run-in-hole.

7 Claims, 9 Drawing Sheets

(51) Int. Cl.
    *E21B 17/10* (2006.01)
    *B23K 9/26* (2006.01)
    *B23K 9/095* (2006.01)
    *B23K 9/16* (2006.01)
    *E21B 17/00* (2006.01)

(52) U.S. Cl.
    CPC .............. *B23K 9/26* (2013.01); *E21B 17/003* (2013.01); *E21B 17/1035* (2013.01); *E21B 47/01* (2013.01)

(56) References Cited

U.S. PATENT DOCUMENTS

| | | | |
|---|---|---|---|
| 4,938,820 A * | 7/1990 | McMills | B29C 66/49 156/83 |
| 5,121,872 A * | 6/1992 | Legget | B21C 37/08 228/148 |
| 7,228,912 B2 | 6/2007 | Patel et al. | |
| 7,802,622 B2 | 9/2010 | Roaldsnes | |
| 8,942,529 B2 | 1/2015 | Gambier et al. | |
| 9,121,962 B2 | 9/2015 | Madhavan et al. | |
| 2004/0134658 A1 | 7/2004 | Bell et al. | |
| 2006/0163225 A1 | 7/2006 | Takahashi et al. | |
| 2006/0289074 A1 | 12/2006 | Eriksson et al. | |
| 2009/0126943 A1 * | 5/2009 | Roaldsnes | E21B 43/08 166/380 |
| 2012/0073804 A1 * | 3/2012 | Harman | E21B 43/128 166/250.01 |
| 2014/0345742 A1 * | 11/2014 | Andreychuk | F16L 9/02 228/144 |
| 2016/0085023 A1 * | 3/2016 | Dowd | G02B 6/4488 385/100 |
| 2018/0371862 A1 * | 12/2018 | Lee | E21B 33/072 |

FOREIGN PATENT DOCUMENTS

| | | |
|---|---|---|
| WO | 9910674 | 3/1999 |
| WO | 2013134201 | 9/2013 |

OTHER PUBLICATIONS

CA2,998,844, "Office Action", dated Sep. 11, 2019, 5 pages.

* cited by examiner

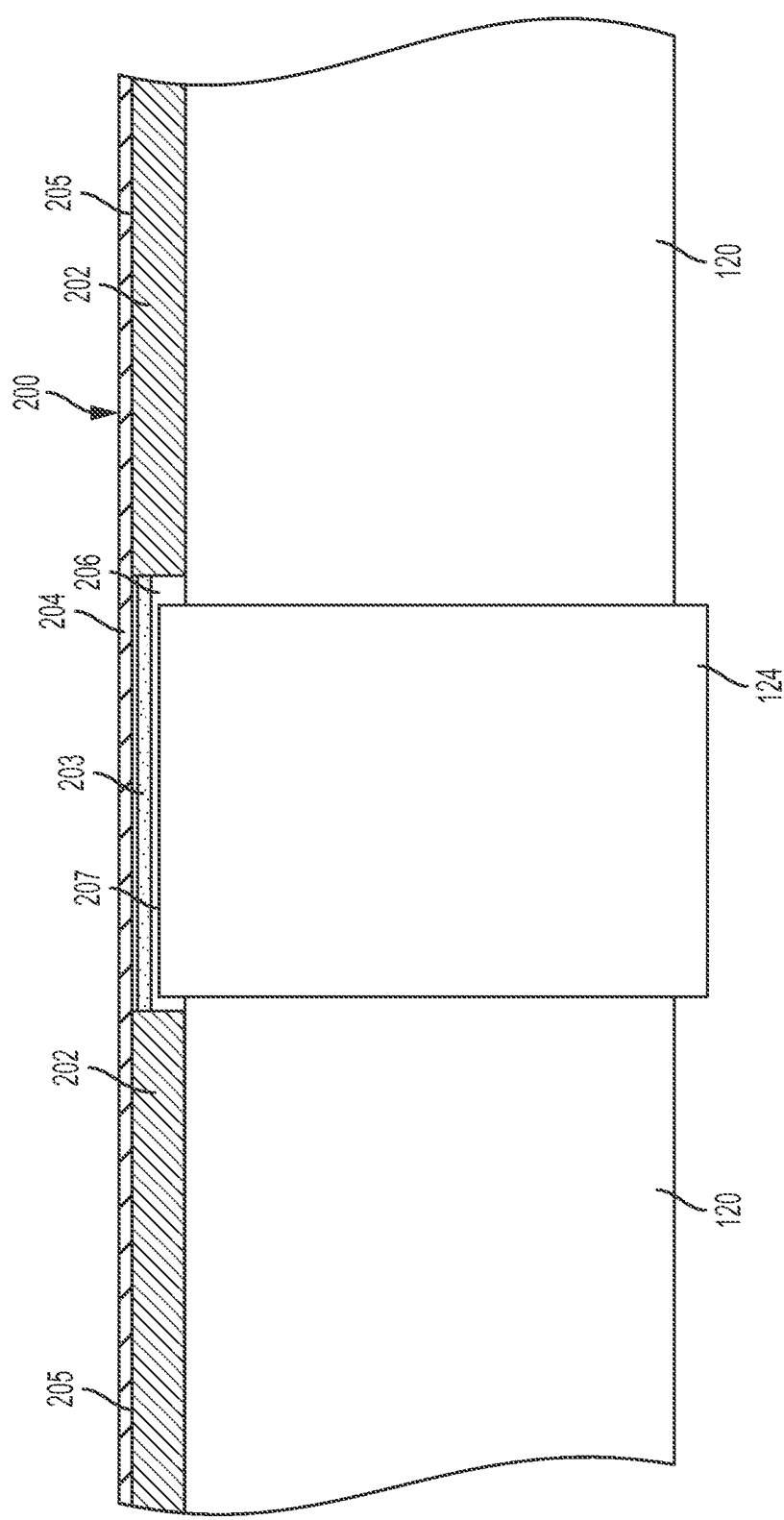

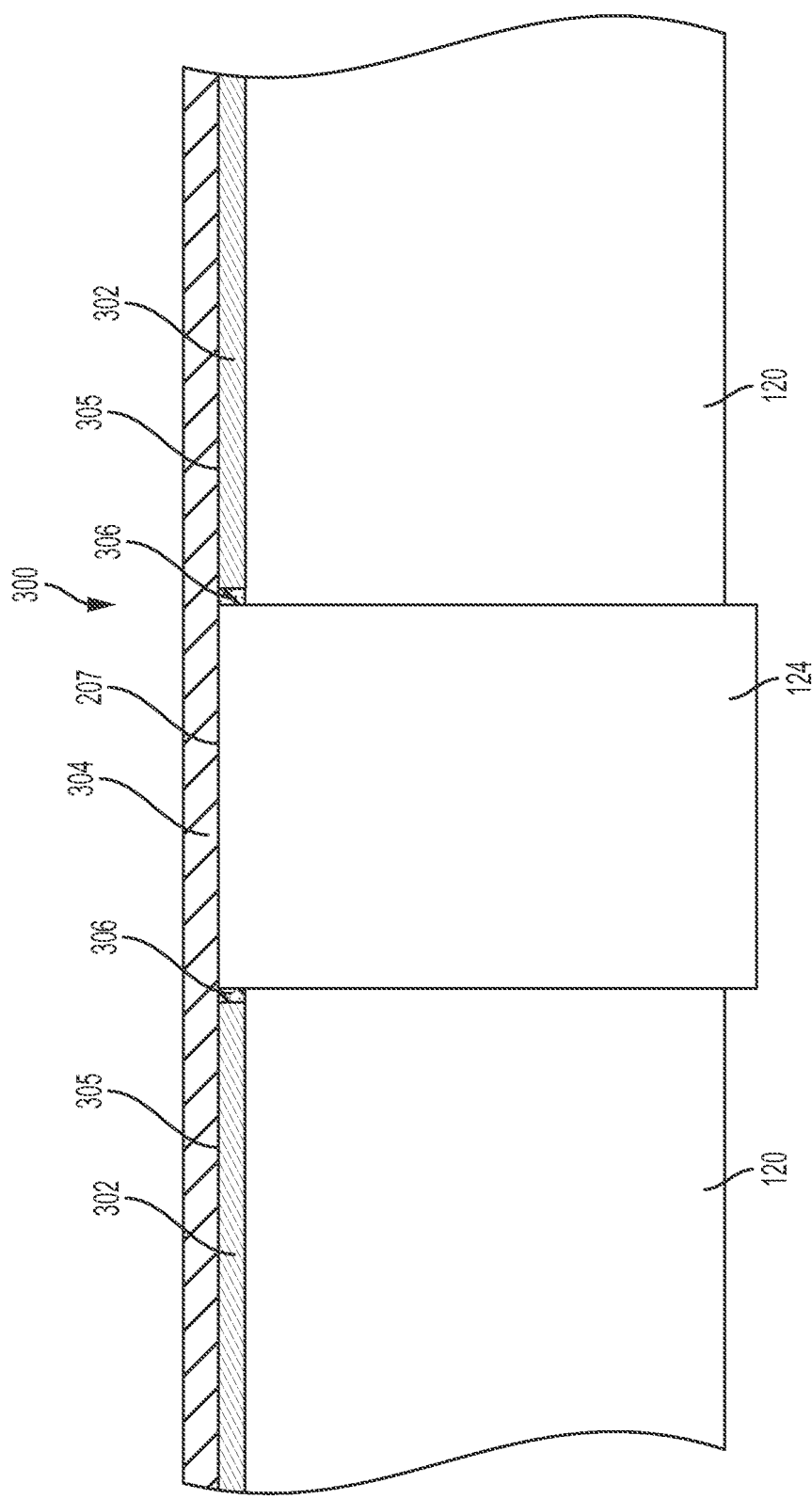

CLAMPLESS CABLE PROTECTOR AND INSTALLATION SYSTEM

TECHNICAL FIELD

The present disclosure relates generally to methods and systems used for deploying cables downhole, and more specifically (although not necessarily exclusively), to methods and systems for deploying cables downhole on a casing string without the use of clamps.

BACKGROUND

Sensing cables can be positioned downhole to monitor conditions in a wellbore, including for example temperature, pressure, and acoustics. The sensing cables can be coupled to a casing string or other tubing string and positioned downhole to monitor the conditions in the wellbore. Knowledge regarding the position of the sensing cable can help to prevent damage to the cable during run-in-hole, cementing, and other downhole procedures, for example, but not limited to, perforating holes in a casing string. Sensing cables can be less likely to be damaged when their positions are known with greater accuracy.

BRIEF DESCRIPTION OF THE DRAWINGS

FIG. 3 is a side view of the casing sections and the cable protector of FIGS. 2A and 2B, according to an aspect of the present disclosure.

FIG. 5 is a side view of the casing sections and the cable protector of FIGS. 4A and 4B, according to an aspect of the present disclosure.

DETAILED DESCRIPTION

Figure 1:
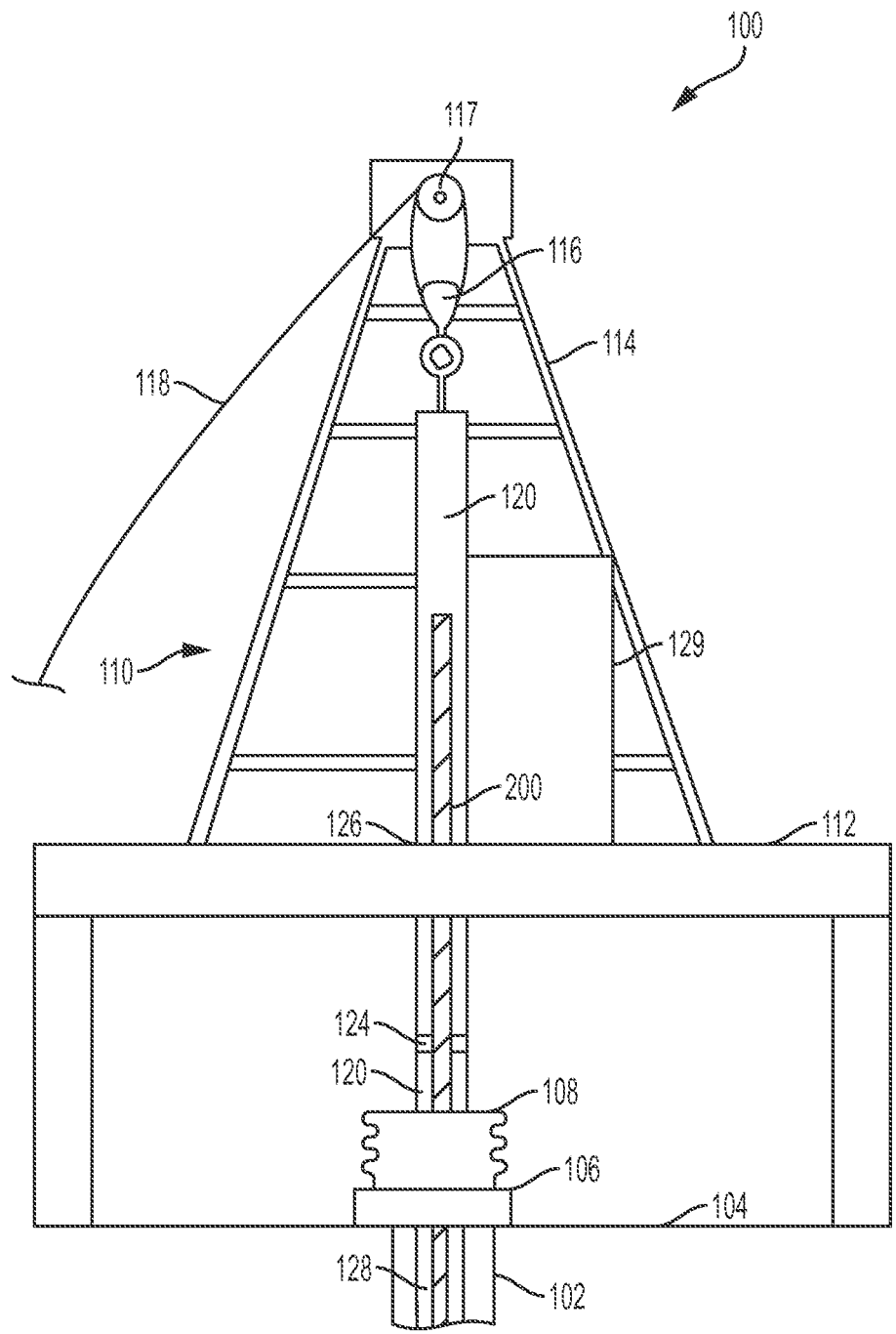
FIG. 1 is a schematic of a well site including a casing section having a cable protector installed thereon according to an aspect of the present disclosure.

Certain aspects and features of the present disclosure are directed to a cable protector that is installable on a casing string without the use of clamps. The cable protector can include two substantially parallel sidebars that can extend along an outer surface of casing section of the casing string. The two sidebars can be welded in place on the outer surface of the casing section. The sidebars can have the same thickness as a casing collar that couples two casing sections together. In some aspects, the sidebars can have a greater thickness than the casing collar and can thereby extend beyond an outer surface of the casing collar. The sidebars can define a valley or cavity that can receive a sensing cable, for example an optical cable (e.g., an optical fiber in a fiber-in-metal tube surrounded by a protective coating) or an electrical cable. A cover strip can be secured in place on top of the side strips and over the sensing cable, for example by welding. The cover strip can be generally rectangular in shape which can minimize the distance the cable protected extends beyond the surface of the casing section. In some aspects, the cover strip can be u-shaped, or another suitable shape.

The sidebars can extend along a length of the casing string and can end at the casing collar that joins two casing sections together. The cover strip and the sensing cable can continue to extend over the casing collar beyond the end of the sidebars. Additional sidebars can extend along the second casing section on the other side of the casing collar. The sensing cable can extend over the casing collar and be positioned between the additional sidebars on the other side of the casing collar. An additional cover strip can cover the sensing cable on the other side of the casing collar and extend along the length of the second casing section.

In some aspects, a cable protector can be installed on a casing section at the wellbore, for example by a cable protector installation system positioned at the wellbore. The cable protector installation system can be positioned on a rig floor at the wellbore and may include multiple welding chambers for welding the side strips and the cover strip in place on the casing section. The cable protector installation system can be controlled by a computing device, or in some aspects can be manually controlled. In some aspects, the cable protector installation system can install the cable protector on the outer surface of a first casing section as the first casing section is being positioned to be coupled to a second casing section at the rig floor. The casing section with the cable protector installed thereon can then be passed through an opening in the rig floor and run into the wellbore.

These illustrative aspects are given to introduce the reader to the general subject matter discussed here and are not intended to limit the scope of the disclosed concepts. The following sections describe various additional features and aspects with reference to the drawings in which like numerals indicate like elements, and directional descriptions are used to describe the illustrative aspects but, like the illustrative aspects, should not be used to limit the present disclosure.

FIG. 1 is a schematic illustration of a well site 100 that includes a wellbore 102 extending from a surface 104. At the surface 104 of the wellbore 102 is a wellhead 106. A blow out preventer ("BOP") 108 can be positioned above the wellhead 106. A drilling rig 110 can be positioned at the well site 100. The drilling rig 110 can include a rig floor 112 and a derrick 114. A travelling block 116 can include pulleys or sheaves 117 that receive wire rope, such as the drilling line 118.

The drilling line 118 can be coupled to a casing section 120. The drilling line 118 and travelling block 116 can be used to position the casing section 120 for coupling to another casing section 120 at a casing joint. The two casing sections 120 can be coupled together using a casing collar 124. The two casing sections 120 can be coupled together either manually or automatically by machinery at the rig floor 112. The casing section 120 can be moved through an opening 126 in the rig floor 112 where it is received by the machinery located below the rig floor at the surface 104 of the wellbore 102, including for example the BOP 108 and the wellhead 106. The casing sections 120 may then enter the wellbore 102. The length of casing sections 120 coupled together and positioned in the wellbore 102 can be referred to as a casing string 128 (or a drill string).

A cable protector installation system 129 can be positioned at the rig floor 112. The cable protector installation system 129 can install a cable protector 200 and a sensing cable (not shown) on the casing sections 120. The sensing cable can sense conditions downhole in the wellbore and transmit the data collected to the surface 104. The sensing cable can be positioned in a cavity created by a cable protector 200. In some aspects, the cable protector 200 can be welded to the casing section 120 at an offsite location. The sensing cable can be an optical cable or an electrical cable.

Figure 2A:
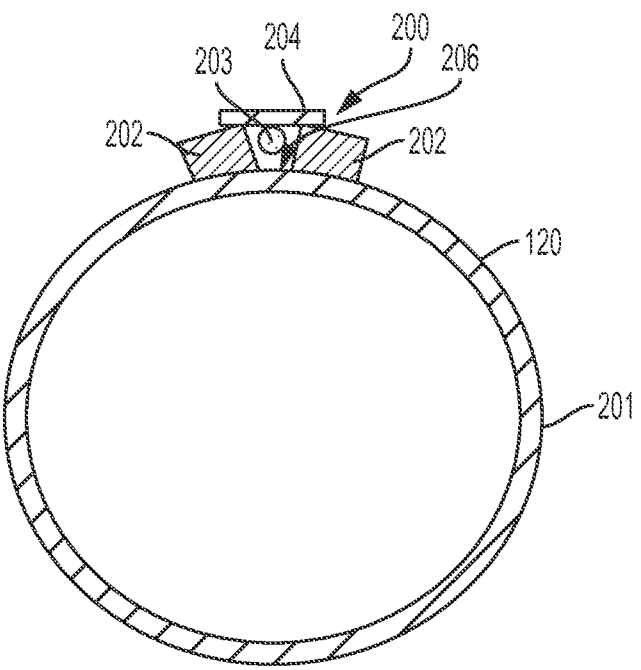
FIG. 2A is a cross-sectional front view of a casing section that includes a cable protector, according to an aspect of the present disclosure.

FIG. 2A shows a front cross-sectional view a cable protector, for example the cable protector 200, according to one aspect of the present disclosure. The cable protector 200 can be positioned on an outer surface 201 of a casing string or a tubing string, for example the casing section 120. The cable protector 200 can include sidebars 202. A cover strip 204 can be positioned on top of the sidebars 202 to define a cavity 206. A sensing cable 203 can be positioned within the cavity 206. The sensing cable 203 can be a fiber-in-metal tube ("FIMT") that is surrounded by an outer protective surface. One or more optical fibers can be positioned within the FIMT. In some aspects, the sensing cable 203 can be an electrical cable. The sidebars 202 and cover strip 204 can protect the sensing cable 203 from damage as the casing section 120 is run downhole, for example damage from abrasion during deployment. In some aspects, the sidebars 202 may be used without the cover strip 204.

The sidebars 202 can be strips or plates of metal. The metal strips or plates may withstand erosion during fracking better than wired cables. The sidebars 202 can be welded to the outer surface 201 of the casing section 120. In some aspects, the sidebars 202 can be welded to the outer surface 201 of the casing section at the well site 100, for example by a system positioned on the rig floor 112. An example of such a system is described with reference to FIG. 6 below. In other aspects, the sidebars 202 can be welded to the casing section 120 at a different location and delivered to the rig floor 112 with the sidebars 202 welded to the casing section 120. The casing sections 120 can include threads that only thread together such that the sidebars 202 on each casing section 120 align. The sensing cable 203 can be laid in the valley between the sidebars 202 and covered with the cover strip 204. In some aspects, the sensing cable 203 can be positioned between the sidebars 202 by the same system that welds the sidebars 202 to the casing section 120. The cover strip 204 can be welded in place against the sidebars 202, such that it covers the sensing cable 203. The cover strip 204 can be welded in place at the well site 100, for example by the same system that welds the sidebars 202 to the casing section 120.

The cable protector 200 can extend along a length of the casing section 120. The sensing cable 203 extends along the length of the casing section 120 within the cavity defined by the cable protector 200. The cable protector 200, and thereby the sensing cable 203 positioned within the cable protector 200, can maintain its position on the outer surface 201 of the casing section 120 during run-in-hole operations. The sensing cable 203 can remain in place without becoming twisted or rotated on the outer surface 201 of the casing section 120. Twisting and rotation of the sensing cable 203 can cause damage to the sensing cable 203, including for example an optical fiber of the sensing cable 203. In addition, in some aspects it can be difficult to determine the location of the sensing cable 203 along the length of the casing section 120 when the sensing cable 203 moves, twists, or rotates on the surface of the casing section 120.

The casing section 120 can be cemented in place during wellbore completion. The cable protector 200 can allow for better cementing around the casing section 120 as compared to other methods and devices that may be used to secure and protect the sensing cable 203 on the outer surface 201 of the casing section 120. For example, clamps, centralizers, and blast protectors used to secure and protect the sensing cable 203 can limit the flow of cement around the casing section 120 during cementing. As a result, the cement job can be weak. The cable protector 200 can allow for better flow of cement around the casing section 120 during cementing. In addition, in some aspects, the casing section 120 may be raised or rotated during the cementing process. As described above, the cable protector 200 and sensing cable 203 can stay in place when the casing section 120 is raised or rotated. Clamps, centralizers, and blast protectors for securing a sensing cable on a casing section can move during raising or rotation of the casing section, which can damage the sensing cable.

Once the casing sections 120 are cemented into place, perforating guns (e.g., a string of shaped charges) can be run into the casing sections 120. The perforating guns can be fired to perforate the casing section 120 and the surrounding cement and put the inside of the casing section 120 in fluid communication with the subterranean foundation. The perforation guns can be oriented away from the sensing cable 203 to prevent damage to the sensing cable 203 by the charges.

The cable protector 200 can aid in determining the location of the sensing cable 203. The sidebars 202 of the cable protector 200 can be metal. The metal of the sidebars 202 can be in contact with a length of a casing section 120. The cable location can be determined using, for example but not limited to, eddy current detectors that transmit a pulse and monitor changes to the decay of the signal over time at various angular locations at a given depth. The sidebars 202 can create a strong, recognizable, eddy current field due to the conductive area of the sidebars 202. The eddy current field can be detected and used to identify the location of the sidebars 202, and thereby the sensing cable 203 positioned between the sidebars 202. A strong eddy current field can be more easily detected than a weak eddy current field. The strong eddy current field created by the sidebars 202 can be stronger than the eddy current field created by wire cables or other elements installed on the casing section 120. For example, wire cables positioned on either side of a sensing cable can be comprised of multiple wires wound together, with each wire having a small conductive area. These smaller segments that make up the wire cable can cause a weaker eddy current as compared to the current created by the larger conductive area of the sidebars 202. In addition, other tools, including, clamps for securing sensing cables, centralizers, blast protectors installed around the casing section 120 can contact the casing section 120 at various contact points. At each of those contact points an eddy current field can be created. A strong eddy current field created by the sidebars 202 increased conductive area along the length of the casing section 210 can be distinguished from weaker eddy current fields created by these other elements.

Figure 2B:
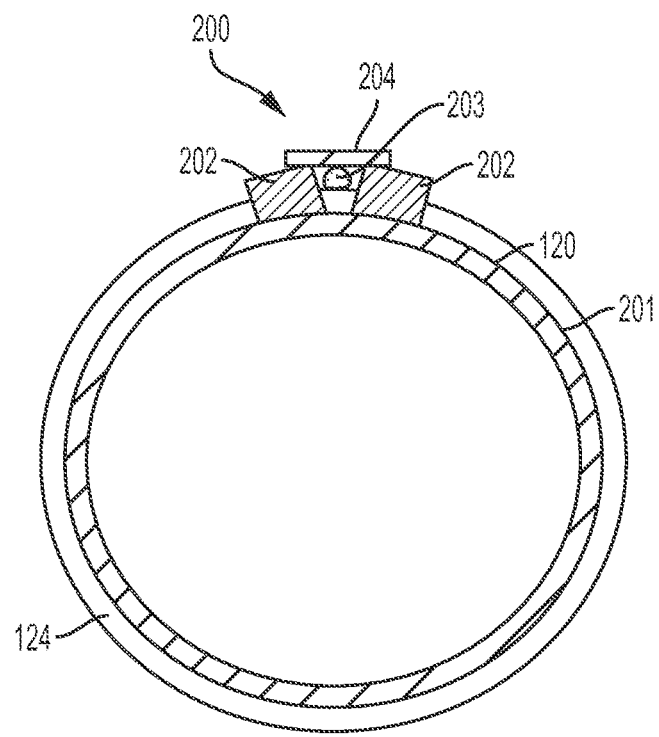
FIG. 2B is a cross-sectional front view of the casing section and the cable protector of FIG. 2A at a casing collar, according to an aspect of the present disclosure.

FIG. 2B shows a front cross-sectional view of the cable protector 200 looking towards a casing joint where two casing sections 120 are coupled together by a casing collar 124. The sidebars 202 can have a thickness that is slightly greater than the thickness of the casing collar 124. The sidebars 202 can extend above the height of the casing collar 124, as shown in FIG. 2B. The cover strip 204 can be a flat strip that can extend across the top surface of the sidebars 202 and cover the sensing cable 203. The distance the cable protector 200 (e.g., the sidebars 202 and the cover strip 204) extends from the outer surface 201 of the casing section 120 can be minimized. Minimizing the total diameter of the casing string (e.g., the casing section 120, the casing collars 124, and the cable protector 200) positioned down hole can allow for use of the cable protector 200 in small wellbores.

FIG. 3 shows a side view of the cable protector 200 on the casing sections 120. The sidebars 202 of the cable protector 200 can extend along a length of the casing sections 120 and end proximate to the casing collar 124 joining the casing sections 120 together. The sidebars 202 installed on either side of the casing collar 124 and may to extend along the length of each casing section 120 coupled together by the casing collar 124. The sensing cable 203 extends along the length of the casing section 120 under the cover strip 204. The sensing cable 203 can also extend over the casing collar 124. The cover strip 204 can extend along the entire length of the casing sections 120, including over the casing collar 124. The cover strip 204 can protect the sensing cable 203 when it is positioned on top of the casing collar 124. As shown in FIG. 3, the thickness of the sidebars 202 can be greater than the thickness of the casing collar 124. A top surface 205 of the sidebars 202 can extend beyond the top surface 207 of the casing collar 124. In some aspects, the cavity 206 defined by the sidebars 202 and the cover strip 204 can be filled with epoxy or other suitable material to block a hydrocarbon migration path through the cavity 206.

The cover strip 204 can be generally rectangular in shape, as shown in FIGS. 2A-3. In some aspects, the cover strip 204 can be a different shape, for example, semi-circular, u-shaped, L-shaped, or any other suitable shape. As shown in FIG. 3, the sensing cable 203 can be exposed on the sides as it passes over the casing collar 124. In some aspects, for example the aspect shown in FIGS. 4A-5, a cover strip can be shaped to prevent exposure of the sensing cable 203 as it passes over the casing collar 124.

Figure 4A:
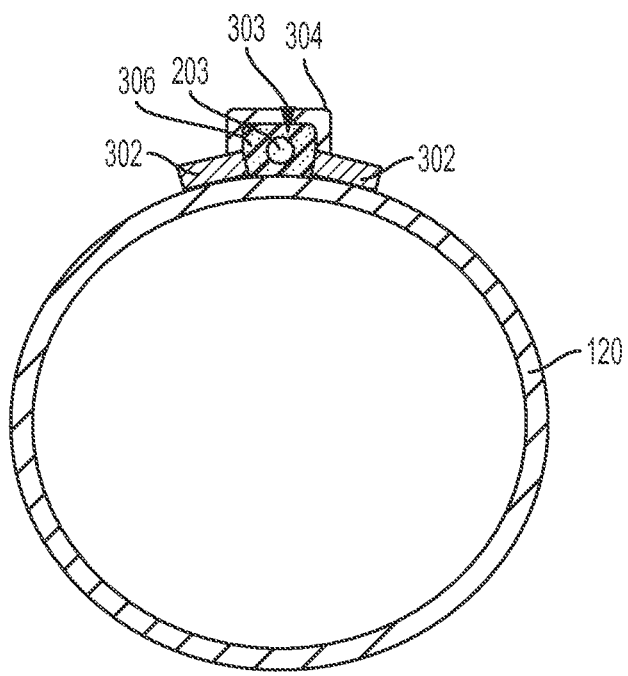
FIG. 4A is a cross-sectional front view of a casing section that includes a cable protector, according to another aspect of the present disclosure.

FIG. 4A shows a front cross-sectional view of a cable protector 300 that has a bent cover strip 304. The cable protector 300 can include sidebars 302 that can be coupled to the casing section 120 by welding or other suitable coupling means (e.g., using adhesives). The sensing cable 203 can be positioned in a cavity 303 between the sidebars 302. The bent cover strip 304 can be positioned over the sensing cable 203 and secured to the sidebars 302. The sensing cable 203 can be protected from abrasion, twisting, or other potentially damaging effects of positioning the casing sections 120 downhole. The bent cover strip 304 can be generally U-shaped, though other suitable shapes could be used. In some aspects, for example, the bent cover strip 304 could be semi-circular, triangular or any other suitable shape. The bent cover strip 304 can be shaped at the well site, or it can be shaped prior to being delivered to the well site. The cavity 303 defined by the sidebars 302 and bent cover strip 304 can be filled with an epoxy 306 or other suitable material to block a hydrocarbon migration path through the cavity 303 and epoxy 306 may be selected to also provide acoustic impedance matching in order to optimize acoustic coupling to the cement and formation. The sensing cable may be used for acoustic seismic sensing and it may be beneficial to have good coupling between the sensing cable and reservoir.

Figure 4B:
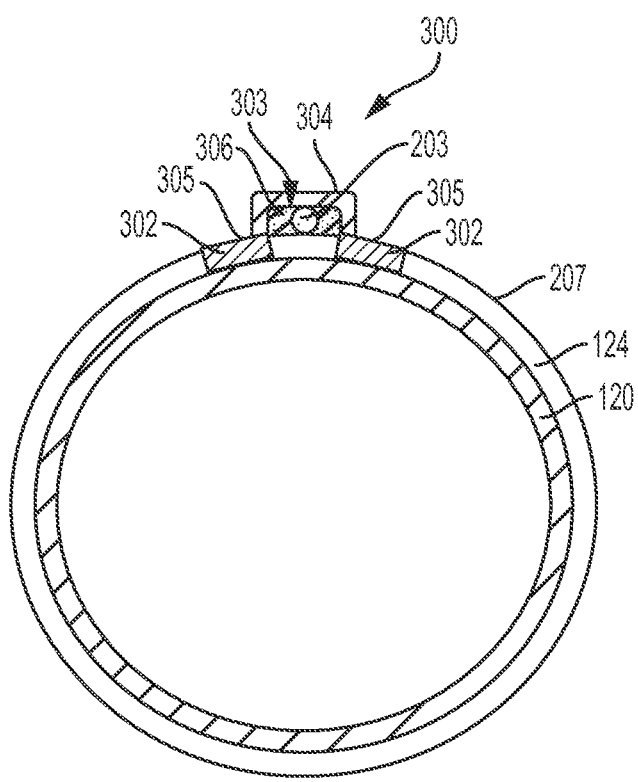
FIG. 4B is a cross-sectional front view of the casing section and the cable protector of FIG. 4A at a casing collar, according to an aspect of the present disclosure.

FIG. 4B shows a front cross-sectional view of the cable protector 300 looking towards a casing joint where two casing sections 120 are coupled together by the casing collar 124. The sensing cable 203 can extend between the sidebars 202 along the length of the casing section 210. The sidebars 302 can each end at the casing collar 124. The sensing cable 203 can extend over the casing collar 124. The sensing cable 203 can pass between the sidebars 302 positioned on the casing section 120 on the other side of the casing collar 124. The bent cover strip 304 can extend the entire length of the casing section 120 and over the top of the casing collar 124. The bent cover strip 304 can protect the sensing cable 203 as it passes over the casing collar 124 outside of the sidebars 302.

FIG. 5 shows a side view of the cable protector 300 on casing sections 120 coupled together by the casing collar 124. The sidebars 302 can extend along the casing sections 120 and end proximate to the casing collar 124 that joins the casing sections 120 together. The sensing cable 203 (not shown) can be positioned between the sidebars 302 and can be covered by the bent cover strip 304. The sidebars 302 and the casing collar 124 can each extend approximately the same distance from the outer surface of the casing section 120. The bent cover strip 304 can extend above the sidebars 302 and casing collar 124.

The sensing cable 203 can be covered by the bent cover strip 304 as it passes over the casing collar 124. The bent cover strip 304 can extend around the sides of the sensing cable 203 as it passes over the casing collar 124. The bent cover strip 304 can protect the sensing cable 203 from damage by surrounding the sensing cable 203 as it extends over the casing collar 124 where no sidebars 302 are present. The epoxy 306 positioned within the cavity 303 can also aid in protecting the sensing cable 203 from damage.

As shown in FIGS. 4B and 5, the sidebars 302 can have a thickness that is approximately equal to the thickness of the casing collar 124 that couples the casing sections 120 together. The top surface 305 of the sidebars 302 can be approximately flush with the top surface 207 of the casing collar 124. The total diameter of the casing string with the cable protector 300 having a bent cover strip 304 can be minimized using sidebars 302 that are approximately the same thickness as the casing collar 124. Minimizing the total diameter of the casing string can allow a casing string that include the cable protector 300 to be used in smaller wellbores.

Figure 6:
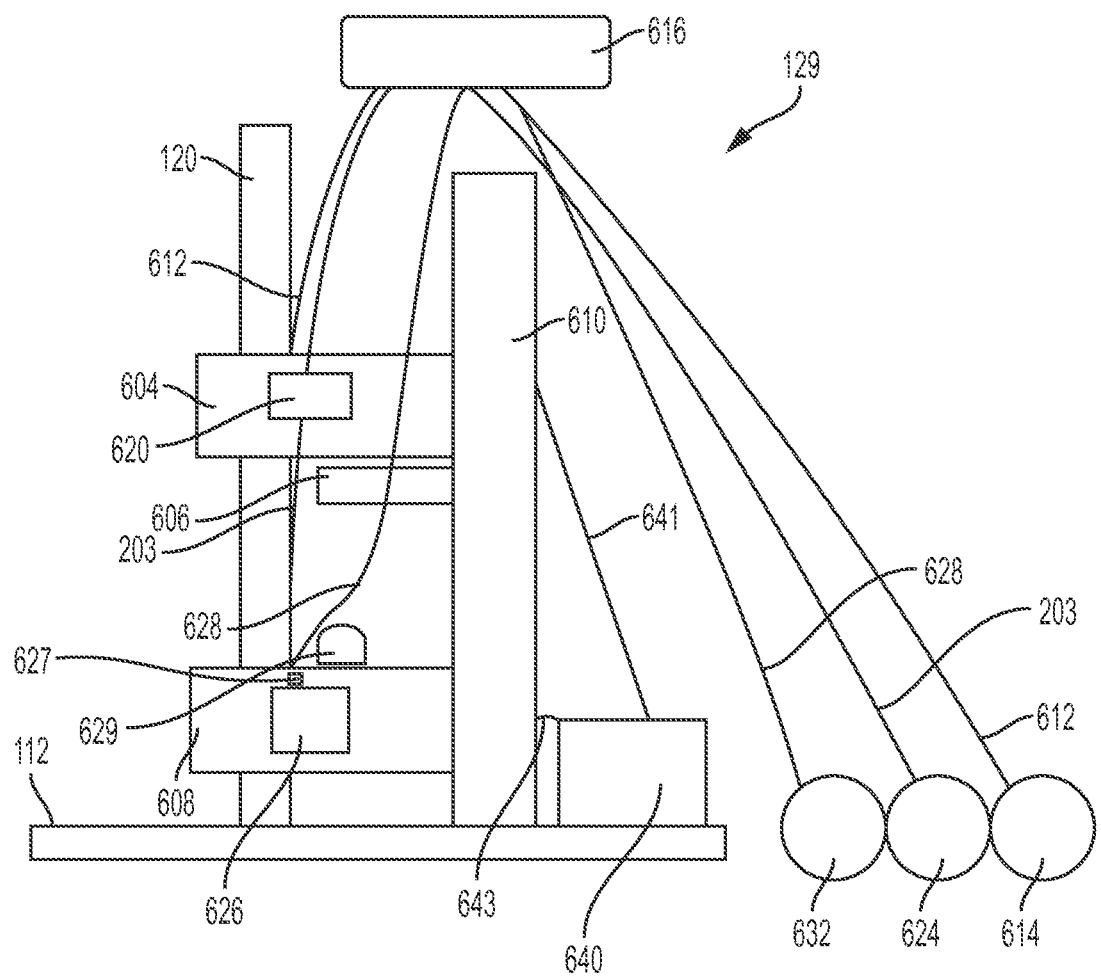
FIG. 6 is a schematic diagram of a system for installing a cable protector, according to an aspect of the present disclosure.

FIG. 6 shows a block diagram of a cable installation system, for example the cable protector installation system 129. Cable protector installation system 129 can install a cable protector, for example, but not limited to, the cable protector 200 or the cable protector 300, on the casing section 120 at a well site. The cable protector installation system 129 can be positioned at the rig floor 112. The cable protector installation system 129 can include a first weld chamber 604, a metal former 606, and a second weld chamber 608. The first weld chamber 604, the metal former 606, and the second weld chamber 608 can each be secured to a support beam 610.

The first weld chamber 604 can include a chamber housing that can enclose and define the first weld chamber 604. The first weld chamber 604 can have an opening in the chamber housing for receiving the casing section 120. A metal strip 612 can be supplied on a spool 614 and fed into the first weld chamber 604 via one of multiple sheaves 616 positioned above the first weld chamber 604. A length of the metal strip 612 can be positioned against the casing section 120 in the first weld chamber 604. The first weld chamber 604 can include a robot welder 620. The robot welder 620 can weld the length of the metal strip 612 to the casing section 120. The robot welder 620 can weld an additional length of the metal strip 612 to the casing section 120 substantially parallel to the initial length of the metal strip 612. The two lengths of metal strips 612 welded to the casing section 120 can be the sidebars of a cable protector (e.g., cable protector 200 or cable protector 300).

After the casing section 120 exits the first weld chamber 604 a cable, for example the sensing cable 203 can be positioned in the cavity formed between the metal strips 612. The sensing cable 203 can be fed into the cavity formed by the lengths of metal strips 612 by one of the multiple sheaves 616 that receives the sensing cable 203 from a spool 624 of sensing cable 203. The spool 624 of sensing cable 203 can be positioned at or near the rig floor 112.

The casing section 120 with the sensing cable 203 positioned between the lengths of metal strips 612 (e.g., the sidebars) can enter a chamber housing of the second weld chamber 608. A robot welder 626 can be positioned within the second weld chamber 608. A cover strip 628 can be fed into the second weld chamber 608 and positioned on top of the metal strips 612. The cover strip 628 can cover the sensing cable 203 positioned between the metal strips 612. The cover strip 628 can be welded in this position on top of the metal strips 612 by the robot welder 626.

The cover strip 628 can be a metal strip that is dispensed by one of the multiple sheaves 616 that receives the cover strip 628 from a spool 632 of metal strips or metal cable. The cover strip 628 can be a flat strip of metal, for example the cover strip 204 shown in FIGS. 2A-2B. In some aspects, the cover strip 628 can be shaped prior to positioning on the metal strip 612 by the metal former 606. The metal former 606 can receive the cover strip 628 and can shape or form the cover strip 628 into the desired shape prior to feeding the cover strip 628 into the second weld chamber 608. In some aspects, the metal former 606 can shape the cover strip 628 into a general U-shape, for example the shape of the bent cover strip 304 shown in FIG. 3A-3B.

The second weld chamber 608 can also include an injector 627. The injector 627 can inject epoxy over the sensing cable 203 positioned between the metal strips 612. The epoxy can fill the space between the metal strips 612 and surround the sensing cable 203. In some aspects, the injector 627 can also inject inert gas into the second weld chamber 608 to over pressurize the second weld chamber 608. The over pressurization with inert gas can improve the weld quality and can also force any flammable gases out of the enclosures. An injector can also be positioned within the first weld chamber 604.

A positioner 629 can help position the cover strip 628 on top of the metal strips 612 that form the sidebars and over the epoxy. The robot welder 626 can weld the cover strip 628 in position on top of the metal strips 612. In some aspects, the injector 627 can inject epoxy into the cavity created by the metal strips 612 and the cover strip 628 after the cover strip 628 has been welded in place. Upon exiting the chamber housing of the second weld chamber 608, the casing section 120 can include the sensing cable 203 installed within the cable protector formed by the metal strips 612 and the cover strip 628. In some aspects, the injector 627 can inject an inert gas into the first weld chamber 604.

The robot welder 620 in the first weld chamber 604 can be in communication with a computing device 640 via a wired communication link 641. The robot welder 626 in the second weld chamber 608 can also be in communication with the computing device 640 via a wired communication link 643. The wired communication links 641, 643 can include interfaces such as Ethernet, USB, IEEE 1394, or a fiber optic interface. In some aspects, wireless communication links may be used instead of the wired communication links 641, 643 and may include wireless interfaces such as IEEE 802.11, Bluetooth, or radio interfaces for accessing cellular telephone networks (e.g., transceiver/antenna for accessing a CDMA, GSM, UMTS, or other mobile communications networks).

The computing device 640 can control one or both robot welders 620, 626. In some aspects, the computing device 640 automatically controls the robot welders 620, 626. In some aspects, the computing device 640 may be in communication with a remote computing device positioned away from the well site 100. The remote computing device can control the robot welders 620, 626. In still yet other aspects, the robot welders 620, 626 are in wireless communication directly with the remote computing device and the computing device 640 is omitted from the system. The computing device 640 can also control the feeding of the metal strips 612 and the cover strip 628 into the respective weld chambers, the positioning of the sensing cable 203, and other installation steps.

The computing device 640 can control additional aspects of the system 600, for example, but not limited to, instructing a cutting device to cut the metal strips 612 at the point where a casing collar couples the two casing sections 120 together. The cutting device can be positioned within the first weld chamber 604 or outside of the first weld chamber 604. In some aspects, the first and second weld chambers 604, 608 can be over pressurized with an inert gas. The over pressurization with inert gas can improve the weld quality and can also force any flammable gases out of the enclosures.

Figure 7:
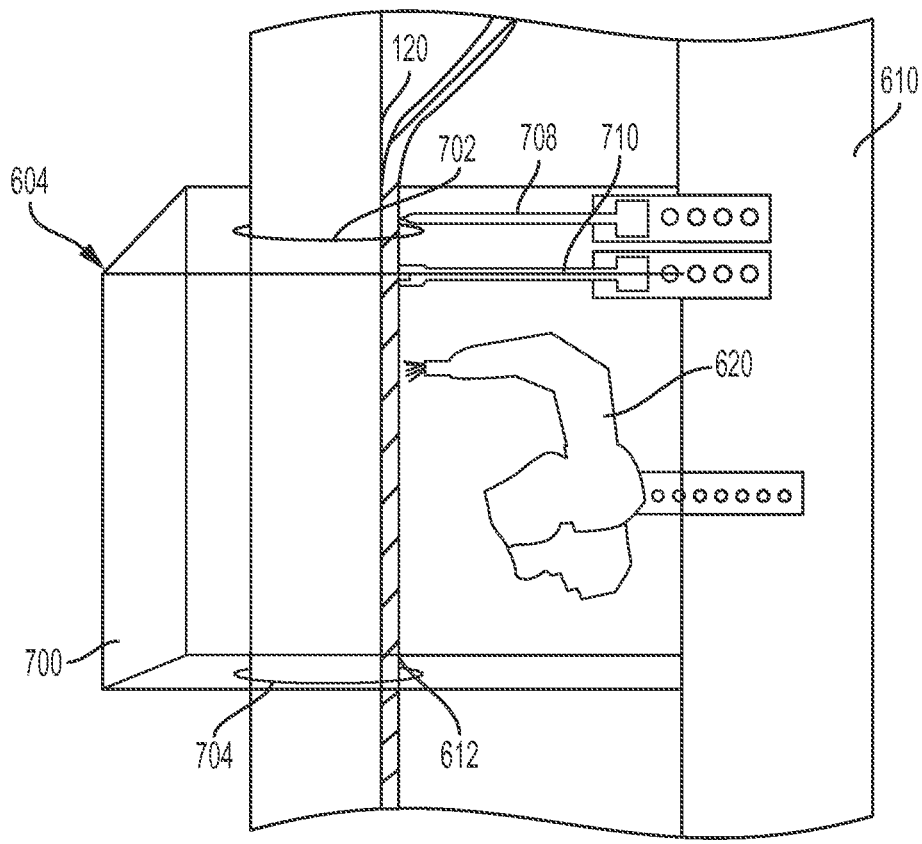
FIG. 7 is a schematic of a welding chamber of the system of FIG. 6, according to an aspect of the present disclosure.

FIG. 7 shows a weld chamber, for example first weld chamber 604. The first weld chamber 604 can include a housing 700 that can have a top opening 702 for receiving the casing section 120. The housing 700 can also include a bottom opening 704 where the casing section 120 can exit the housing 700. The metal strip 612 can enter the housing 700 through the top opening 702. In some aspects, the metal strip 612 can enter the housing 700 through another opening. The first weld chamber 604 can also include positioner 710 which can receive the metal strip 612 and position it on the outer surface of the casing section 120. The positioner 710 can be coupled to the support beam 610. A welding machine, for example robot welder 620, can be positioned within the housing 700. The robot welder 620 can also be coupled to the support beam 610.

The first weld chamber 604 can also include a cutting device 708 for cutting the metal strip 612. For example, as an end of the casing section 120 enters the housing 700 the cutting device 708 can be activated to cut the metal strip 612, for example by using shears, by grinding the metal strip 612, or other suitable methods. The cutting device 708 can be activated automatically or manually in response to detecting the end of the casing section 120 where a casing collar couples two casing sections 120 together.

The robot welder 620 can weld the metal strip 612 in place. The positioner 710 can also position a second metal strip 612 on the outer surface of the casing section 120. The robot welder 620 can weld the second metal strip 612 in place on the outer surface of the casing section 120. In some aspects, an additional positioner or additional robot welder can be positioned within the housing 700 to weld the second metal strip 612 in place. The casing section 120 can exit the housing 700 through the bottom opening 704. The robot welder 620 can be remotely controlled by a computing device. In some aspects, a person could manually control the robot welder 620.

Figure 8:
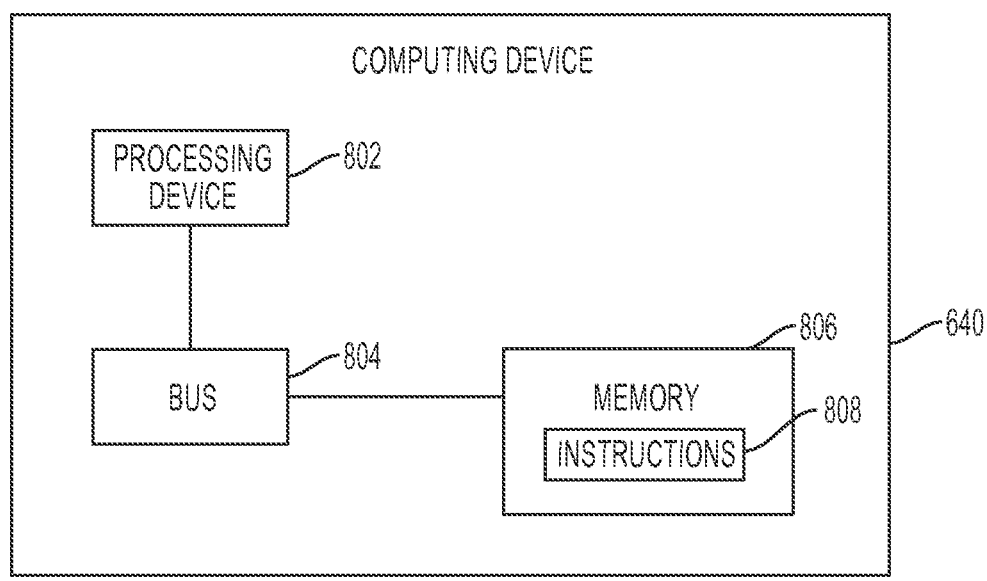
FIG. 8 is a block diagram depicting an example of a controller for controlling a cable installation system, according to an aspect of the present disclosure.

FIG. 8 is a block diagram depicting an example of a computing device, for example computing device 640 for performing the method described above, according to one aspect of the present disclosure. The computing device 640 includes a processing device 802, a memory device 806, and a bus 804.

The processing device 802 can execute one or more operations for controlling various equipment parts of the cable protector installation system 129, including, but not limited to, the robot welders 620, 626, the metal former 606, and the cutting device 708. The processing device 802 can execute instructions 808 stored in the memory device 806 to perform the operations. The processing device 802 can include one processing device or multiple processing devices. Non-limiting examples of the processing device 802 include a Field-Programmable Gate Array ("FPGA"), an application-specific integrated circuit ("ASIC"), a microprocessor, etc.

The processing device 802 can be communicatively coupled to the memory device 806 via the bus 804. The non-volatile memory device 806 may include any type of memory device that retains stored information when powered off. Non-limiting examples of the memory device 806 include EEPROM, flash memory, or any other type of non-volatile memory. In some aspects, at least some of the memory device 806 can include a medium from which the processing device 802 can read the instructions 808. A computer-readable medium can include electronic, optical, magnetic, or other storage devices capable of providing the processing device with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions may include processor-specific instructions generated by a compiler or an interpreter from code written in any suitable computer-programming language, including, for example, C, C++, C #, etc.

Figure 9:
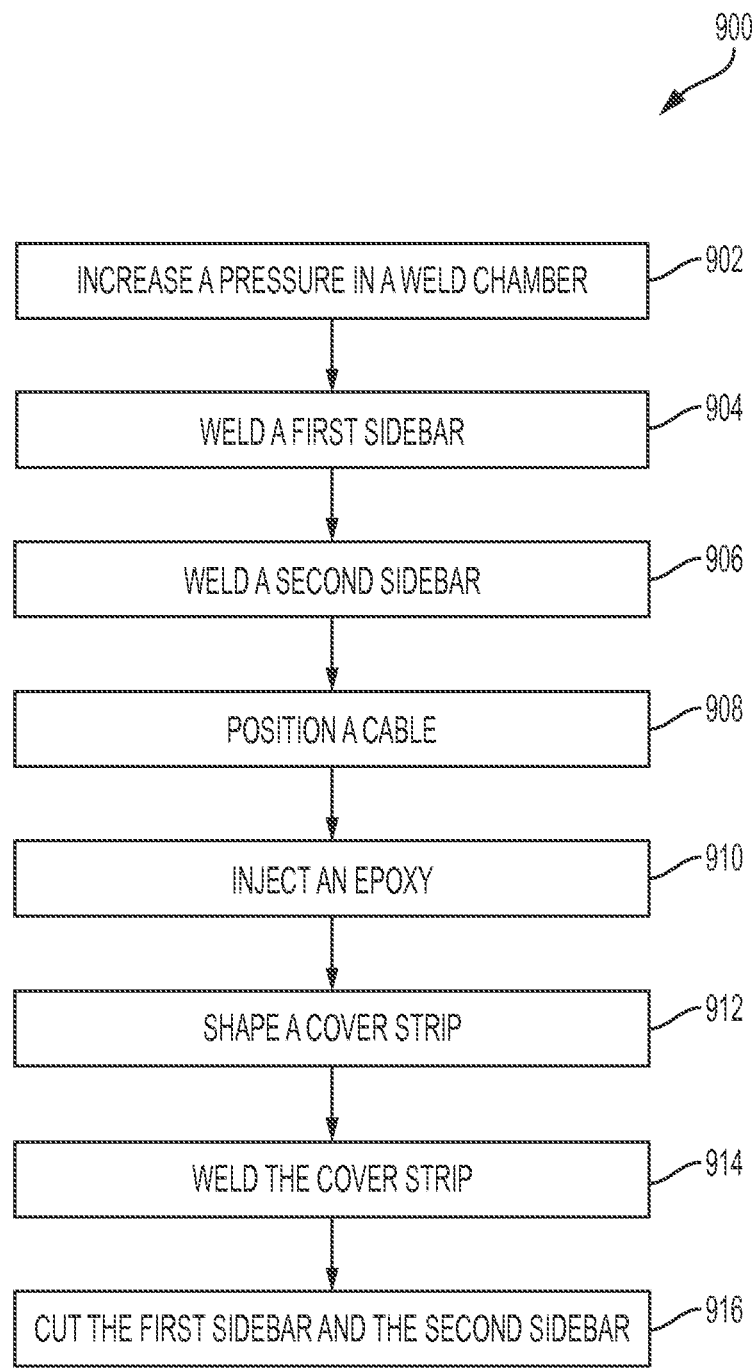
FIG. 9 is an example of a flow chart for a process installing a cable protector, according to one aspect of the present disclosure.

FIG. 9 is an example of a flow chart of a process 900 for installing a cable protector on a casing section, for example the cable protector 200 or the cable protector 300. In some aspects, the process 900 may be controlled in whole or in part by a computing device, for example computing device 640 of the cable protector installation system 129. The process 900 below is described with reference to components described above with regard to FIGS. 6 and 7. At block 902 a pressure in a weld chamber of the cable protector installation system 129 can be increased, for example to over-pressurize the weld chamber. The pressure can be increased by injecting an inert gas into the weld chamber. The weld chamber can be, for example, the first weld chamber 604. The weld chamber can be positioned at the well site, for example at a rig floor.

In block 904 a first sidebar can be welded to an outer surface of a casing string positioned within the weld chamber. The first side bar can be formed by a metal strip. The first sidebar may be welded to the outer surface of the casing string by a robot welder, for example robot welder 620. In block 906 a second sidebar can be welded to the outer surface of the casing section within the weld chamber. The first sidebar and the second sidebar can approximately parallel to one another. The second sidebar can be welded to the outer surface of the casing section by a robot welder, for example robot welder 620.

In block 908 a cable, for example sensing cable 203, can be positioned between the first sidebar and the second sidebar. The sensing cable 203 can be positioned between the first sidebar and the second sidebar within the weld chamber, outside of the weld chamber, or inside of an additional weld chamber, for example the second weld chamber 608.

In block 910 an epoxy can be injected between the first sidebar and the second side bar and over the cable. In some aspects, the epoxy can be injected by an injector positioned in the first weld chamber or the second weld chamber, in some aspects the injector can be positioned outside of a weld chamber. In addition, in some aspects no epoxy is used, or the epoxy is injected after the installation of a cover strip.

In block 912 a cover strip can be shaped by a machine former. The cover strip can be shaped to be a general U-shape, a triangle shape, a semi-circle shape, or any other suitable shape. In some aspects, the cover strip is not shaped, but instead is received on a spool in its desired shape.

The casing section can enter another weld chamber, for example, the second weld chamber 608. At block 914 the cover strip can be welded on top of the first sidebar and the second sidebar. The cover strip can extend over the cable positioned between the first sidebar and the second sidebar. The cover strip can be welded in place by a robot welder, for example the robot welder 626 in the second weld chamber 608.

In block 916 a cutting device, for example cutting device 708, can cut the first sidebar and the second sidebar at a location proximate to a casing collar that couples two casing sections together. In some aspects the cutting device can be positioned outside of the first weld chamber 604. The cutting device 708 may cut the first sidebar and the second sidebar prior to being welded against the outer surface of the casing section, for example by cutting the metals strips that comprise the first sidebar and the second side bar.

Example #1

A method can include welding a first side bar along a length of a casing section. A second side bar may be welded along the length of the casing section. The second side bar being positioned substantially parallel to the first side bar. While the casing section is being run-in-hole, a cable may be positioned between the first side bar and the second side bar. While the casing section is being run-in-hole, a cover strip may be welded on top of the first side bar and the second side bar.

Example #2

The method of Example #1 may further include shaping the cover strip into a desired shape while the casing section is being run-in-hole.

Example #3

The method of Example #2 may further feature the desired shape being generally u-shaped.

Example #4

The method of any of Examples #1-3 may further feature welding the first side bar in a welding chamber as the casing section is being run-in-hole.

Example #5

The method of any of Examples #1-4 may further feature cutting the first side bar, while the casing section is being run-in-hole, in response to detecting an end of the casing section.

Example #6

The method of Example #4 may further feature increasing a pressure in the welding chamber by injecting an inert gas into the welding chamber.

Example #7

The method of any of Examples #1-6 may further feature injecting an epoxy over the cable within a cavity between the first side bar and the second side bar.

Example #8

A welding system can comprise a first weld chamber positionable at a well site. The first weld chamber can include a first chamber housing for receiving a casing section. The first weld chamber can also include a first welding robot in communication with a computing device. The first welding robot can be for welding two sidebars to the casing section. The first weld chamber can also include a cutting device for cutting the two sidebars as well as a cable feeder for positioning a cable between the two sidebars. The system can also include a second weld chamber positionable at the well site for receiving the casing section. The second weld chamber can include a second chamber housing. The second weld chamber can include a second welding robot in communication with the computing device. The second welding robot can be for welding a cover strip on top of the two sidebars and the cable positioned between the two sidebars.

Example #9

The system of Example #8 may further feature the first weld chamber including a gas injector for injecting an inert gas into the first chamber housing.

Example #10

Any of the systems of Examples #8-9 may further feature the second weld chamber further comprising an injector for injecting epoxy over the cable positioned between the two sidebars.

Example #11

The system of Example #9 may further feature the first chamber housing including a top opening and a bottom opening each approximately the same diameter as the casing section. The diameters of the top opening and the bottom opening can be such that an interior of the first chamber housing can have a pressure that is higher than exterior of the first chamber housing.

Example #12

The system of any of Examples #8-11 may also feature the second weld chamber including an additional gas injector for injecting an inert gas into the second chamber housing.

Example #13

A casing string can include a casing section and a first side bar secured on an outer surface of the casing section. A second side bar may be secured on the outer surface of the casing section. The second side bar may be substantially parallel to the first side bar. A cable may be positioned between the first side bar and the second side bar. A cover strip may extend between the first side bar and the second side bar and may secure the cable between the first side bar and the second side bar without the use of a clamp.

Example #14

The casing string of Example #13 may further feature the first side bar being formed by welding a metal strip to the outer surface of the casing section in a welding chamber. The welding chamber may be positioned at a well site.

Example #15

The casing string of any of Examples #13-14 may further feature the cover strip being formed by welding a metal strip on top of the first side bar and the second side bar. The cover strip welded in a welding chamber positioned at a well site.

Example #16

The casing string of any of Examples #13-15 may further feature the cover strip being generally u-shaped.

Example #17

The casing string of any of Examples #13-16 may further feature the cable including a fiber-in-metal-tube having an optical fiber.

Example #18

The casing string of any of Examples #13-17 may further feature a casing collar that couples the casing section to another casing section. In addition, the first side bar and the second side bar may not extend linearly over the casing collar.

Example #19

The casing string of Example #18 may further feature the cable and the cover strip each extending linearly over the casing collar.

Example #20

The casing string of Example #18 may further feature the casing collar extending above the casing section approximately the same amount that the first side bar extends above the casing section. The second side bar may also extend about the casing section approximately the same amount as the first side bar and the casing collar.

The foregoing description of certain aspects, including illustrated aspects, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
welding a first side bar along a length of a casing section;
welding a second side bar along the length of the casing section, the second side bar being positioned substantially parallel to the first side bar;
positioning, while the casing section is being run-in-hole, a cable between the first side bar and the second side bar; and
welding, while the casing section is being run-in-hole, a cover strip on top of the first side bar and the second side bar.

2. The method of claim 1, further comprising:
shaping, while the casing section is being run-in-hole, the cover strip into a desired shape.

3. The method of claim 2, wherein the desired shape is generally u-shaped.

4. The method of claim 1, wherein welding the first side bar along the length of the casing section comprises welding the first side bar in a welding chamber as the casing section is being run-in-hole.

5. The method of claim 1, further comprising:
cutting the first side bar, while the casing section is being run-in-hole, in response to detecting an end of the casing section.

6. The method of claim 4, further comprising:
increasing a pressure in the welding chamber by injecting an inert gas into the welding chamber.

7. The method of claim 1, further comprising:
injecting an epoxy over the cable within a cavity between the first side bar and the second side bar.

\* \* \* \* \*